Figure 1:
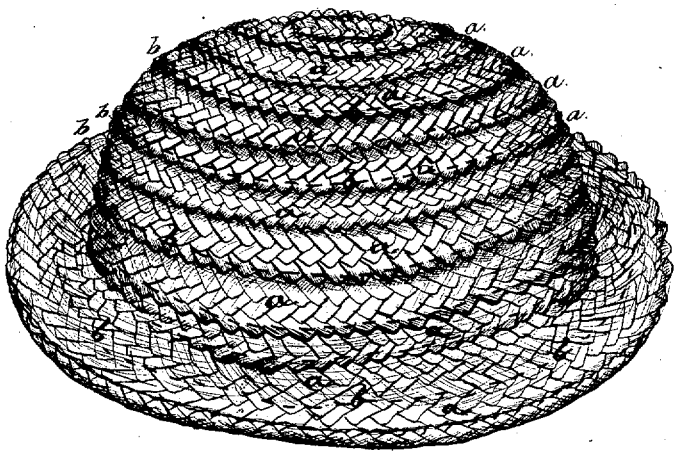
Figure 2:
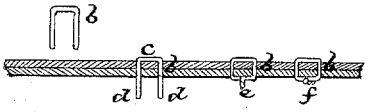

J. KEITH.

Metallic Seams for Uniting Materials.

No. 5,645. Reissued Nov. 4, 1873.

*Witnesses:*
Mg. W. Frothingham.
Jeff. H. Gratacher.

*Inventor:*
Jeremiah Keith.
By his Attys.
Crosby & Gould

AM. PHOTO-LITHOGRAPHIC Co. N.Y. (OSBORNE'S PROCESS.)

UNITED STATES PATENT OFFICE.

JEREMIAH KEITH, OF PROVIDENCE, RHODE ISLAND, ASSIGNOR TO T. K. REED, OF EAST BRIDGEWATER; SAID REED ASSIGNOR TO A. B. KEITH, TRUSTEE, OF BOSTON, MASSACHUSETTS.

IMPROVEMENT IN METALLIC SEAMS FOR UNITING MATERIALS.

Specification forming part of Letters Patent No. 110,921, dated January 10, 1871; reissue No. 5,645, dated November 4, 1873; application filed October 23, 1873.

*To all whom it may concern:*

Be it known that I, JEREMIAH KEITH, of Providence, in the county of Providence and State of Rhode Island, have invented an Improvement in Securing Together Braids of Straw, &c.; and I do hereby declare that the following, taken in connection with the drawing which accompanies and forms part of this specification, is a description of my invention sufficient to enable those skilled in the art to practice it.

The invention relates to a new method of uniting pieces of goods, where such union has heretofore been effected by stitching or sewing with thread, the rotting or breaking of which soon destroys or injures the work, the invention being particularly applicable to the manufacture of straw or palm-leaf goods, such as hats and bonnets, which are made by coiling a long ribbon of braided straw and fastening the adjacent coils together.

In my invention I prefer to use wire staples for fastenings, driving them through the parts to be joined, bringing the heads tightly against the goods, and joining the adjacent inner ends or legs of the fastenings, twisting them together and bending them down against the inner surface of the goods. My invention consists in a hat or other article made of braided straw, palm-leaf, or other material, having the parts fastened together by wires, the ends of which are, preferably, twisted and bent down against the inner surface of the goods.

The drawing represents a hat made in accordance with my invention, and a sectional view, showing the manner of applying the staples.

*a a* represent the coils of braids brought into respective position, as in the ordinary manufacture of hats, the edges being lapped sufficiently to enable them to be fastened together, leaving but one edge in sight. As the coil is being formed, and as the parts to be connected are brought together, the staples *b* are driven or drawn in, the two points of each staple passing into the outer braid near and parallel to its edge, and then through the under or lapped braid, it being drawn through so as to bring the head of the staple against the outer surface of the outer braid, as seen at *c*, leaving the two ends projecting beyond the inner surface of the inner braid, as seen at *d d*. These two ends are now brought together and twisted, as seen at *e*, and the twist may be subsequently driven down against the braid, as seen at *f*. The braids thus fastened form a very strong material, and the staples never break or become unfastened, nor does one fastening depend for its strength upon the integrity of adjacent ones, as is the case with stitches.

In practice, I design to use a machine that cuts the wire into proper lengths, bends them into staple form, and successively inserts and twists the staples; but all this, as well as the bending of each twist down, may be effected by hand.

I claim—

A seam formed of metal fastenings, the adjacent points of which are twisted together, substantially as shown and described.

JEREMIAH KEITH.

Witnesses:

FRANCIS GOULD,

M. W. FROTHINGHAM.